United States Patent [19]
Minott

[11] Patent Number: 5,357,371
[45] Date of Patent: Oct. 18, 1994

[54] LASER RETROREFLECTOR ARRAY HAVING CAT-EYE RETROREFLECTORS

[75] Inventor: Peter O. Minott, Bowie, Md.

[73] Assignee: The United States of America as represented by the Administrator, National Aeronautics & Space Administration, Washington, D.C.

[21] Appl. No.: 949,199

[22] Filed: Sep. 22, 1992

[51] Int. Cl.$^5$ .............................................. G02B 5/126
[52] U.S. Cl. .................... 359/534; 359/546; 359/731
[58] Field of Search .............. 359/515, 527, 529–541, 359/543, 546, 547–553, 726, 727, 730, 731, 733–736, 857–859, 542

[56] References Cited

U.S. PATENT DOCUMENTS

| | | | |
|---|---|---|---|
| 3,551,024 | 12/1970 | Priest, Jr. | 359/726 |
| 3,832,056 | 8/1974 | Shipp et al. | 250/221 |
| 4,486,073 | 12/1984 | Boyd | 359/530 |
| 4,600,299 | 7/1986 | Abshire . | |
| 4,889,409 | 12/1989 | Atcheson . | |

OTHER PUBLICATIONS

Kingslake, R., "Optical System Design", Academic Press, Inc., p. 248, Copyright 1983, Academic Press.

Kingslake, R., "Lens Design Fundamentals", Academic Press, Inc. pp. 311–313, Copyright 1978, Academic Press.

Fitzmaurice, M. W. et al., "Prelaunch Testing of the Laser Geodynamic Satellite (LAGEOS)", Instrument Division Goddard Space Flight Center, Greenbelt, Md., Mar. 1977, entire document.

*Primary Examiner*—Scott J. Sugarman
*Assistant Examiner*—James Phan
*Attorney, Agent, or Firm*—Paul S. Clohan, Jr.; Robert D. Marchant; Guy M. Miller

[57] ABSTRACT

A laser retroreflector array is provided having an array of cat-eye retroreflectors each with an image forming objective through which the laser beam passes and a partial mirror at the focal plane of the image forming objective. By using the cat-eye retroreflectors to reflect the laser beam, the field of view can be angularly limited so that only one retroreflector in the array at a time reflects the laser beam.

11 Claims, 2 Drawing Sheets

LASER RETROREFLECTOR ARRAY HAVING CAT-EYE RETROREFLECTORS

ORIGIN OF THE INVENTION

The invention described herein was made by employees of the U.S. government and may be manufactured and used by or for the government for governmental purposes without the payment of any royalties thereon or therefore.

BACKGROUND OF THE INVENTION

1. Field of the Invention

The present invention relates generally to laser retroreflector arrays and, more specifically, to a laser retroreflector array with cat-eye retroreflectors.

2. Description of the Related Art

A laser retroreflector is used to return a laser beam in the direction of its source. The laser retroreflector can therefore be utilized to make precise determinations of distances from the laser retroreflector. For example, an array of laser retroreflectors can be provided on a satellite for the purpose of studying the Earth's crustal dynamics.

A conventional laser retroreflector array (LRA) has used optical cube-corner prisms as retroreflectors. The optical cube-corner prisms have provided reflections from these satellites With precisely known relationships to the satellite center of gravity. For example, the satellites LAGEOS1 and LAGEOS2 both utilize such laser retroreflector arrays with cube-corner prisms. LAGEOS2 is described in "Prelaunch Testing of the Laser Geodynamic Satellite (LAGEOS)" M. W. Fitzmaurice, P. O. Minott, J. B. Abshire, H. E. Rowe.

With the conventional laser retroreflector arrays using cube-corner prisms, however, it is impossible to design the laser retroreflector arrays so that only one cube-corner prism at a time reflects the laser beam. Due to the wide angle of acceptance (approximately 120°) of these conventional cube-corner prisms, it is impossible to design the array so that only one cube-corner prism reflects the laser beam at a time. This causes the laser retroreflector arrays to be affected by coherent interference effects between the cube corners and creates chromatic and polarization effects. Also, range correction is rendered dependent on the position of the receiver in the far-field diffraction pattern. The net result is a limitation on the accuracy of laser ranging measurements, as well as an increase in cost and decrease in efficiency of providing precise laser ranging results.

SUMMARY OF THE INVENTION

An object of the invention is to provide a laser retroreflector array which reflects the laser beam in only one retroreflector at a time.

Another object of the invention is to eliminate the effects on laser retroreflectors caused by interference from adjacent laser retroreflectors in a laser retroreflector array.

Still another object of the invention is to provide freedom of distribution of retroreflectors within a laser retroreflector array without limiting laser ranging accuracy.

The above and other objects can be obtained by a laser retroreflector array which includes and array of cat-eye retroreflectors with an image forming objective through which the laser beam passes and a partial mirror at the focal plane of the image forming objective. By using the cat-eye retroreflectors to reflect the laser beam, the field of view can be angularly limited so that only one retroreflector at a time reflects the laser beam.

The above-mentioned and other objects and features of the present invention will become more apparent from the following description when read in conjunction with the accompanying drawings.

DETAILED DESCRIPTION OF THE PREFERRED EMBODIMENT

Figure 1:
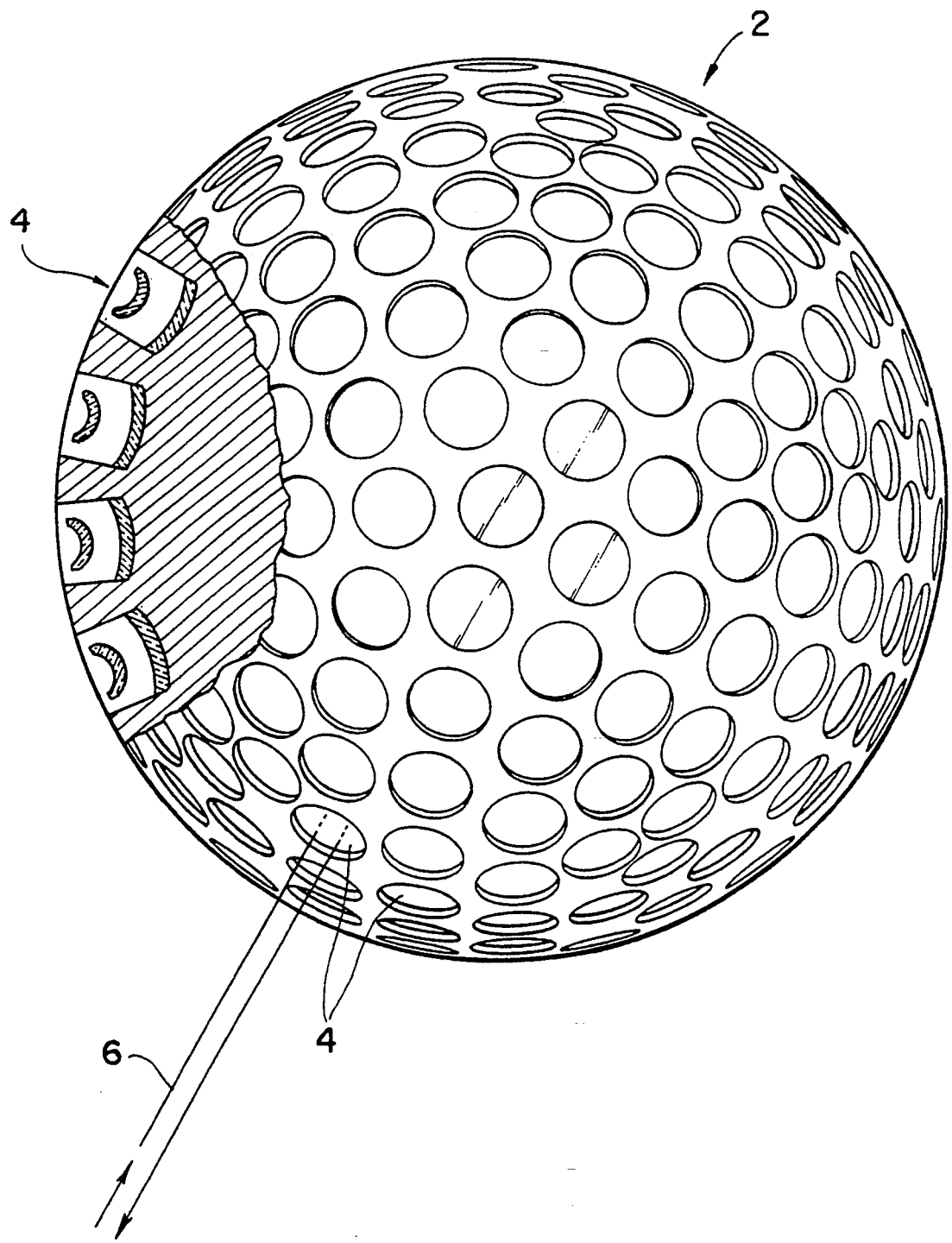
FIG. 1 is an external view of a spherical laser retroreflector array.

In one embodiment of the present invention, the laser retroreflector arrays shown in FIG. 1 is provided as a spherical array 2 of cat-eye retroreflectors 4. Each cat-eye retroreflector 4 has a concentric image forming objective through which the laser beam passes, and a mirror at the focal plane of the concentric image forming objective. The cat-eye retroreflectors 4 reflect the laser beam 6 at the focal plane, so that the field of view can be angularly limited such that only one retroreflector at a time reflects the laser beam. The image forming objective in the preferred embodiment has a focal plane on the rear surface of a corrector plate. The corrector plate has been aluminized over a selected portion to provide reflectivity within only the field of view.

Figure 2:
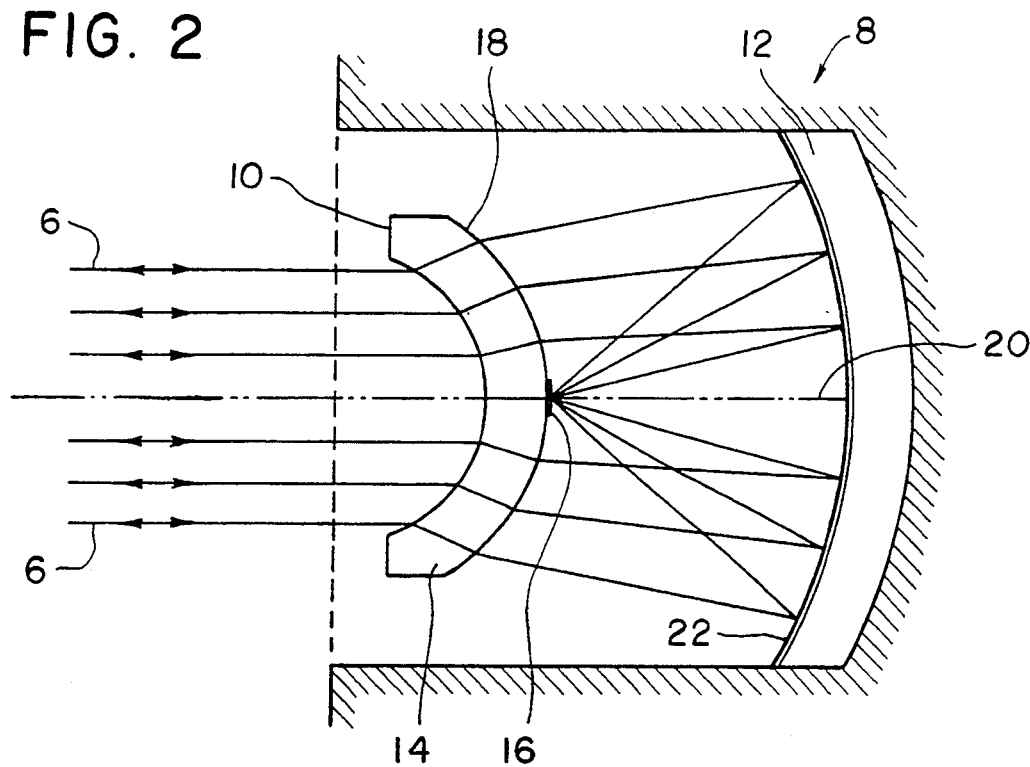
FIG. 2 is an external view of a cat-eye retroreflector which reflects a laser beam within its field of view.

FIG. 2 is an overall view of the cat-eye retroreflector provided in the laser retroreflectors arrays of the present invention. The cat-eye retroreflector performs retroreflection by providing a partial mirror at the focal plane of the concentric image forming objective. As a result, the field of view of the retroreflector is limited so that only one of the retroreflectors 4 in the same spherical array 2 reflects the laser beam 6 at a time.

In FIG. 2, the laser beam 6 enters the cat-eye retroreflector 8 through a spherical corrector plate 10, which redirects the laser beam 6 onto a reflective surface 22 of a spherical primary 12 having a common center with the corrector plate 10. When the laser beam 6 falls within the field-of-view of the cat-eye retroreflector 8, the spherical primary 12 reflects the laser beam 6 onto the spherical secondary 14. The spherical secondary 14 is formed by aluminizing a selected portion 16 at the back surface 18 of the corrector plate 10 at the focal plane 20 of the cat-eye retroreflector. When the laser beam 6 is incident to the retroreflector 8 at an orthogonal angle, the reflective portion 16 reflects the laser beam 6 onto the spherical primary 12, which returns the laser beam 6 in-the direction of its source, as shown.

Figure 3:
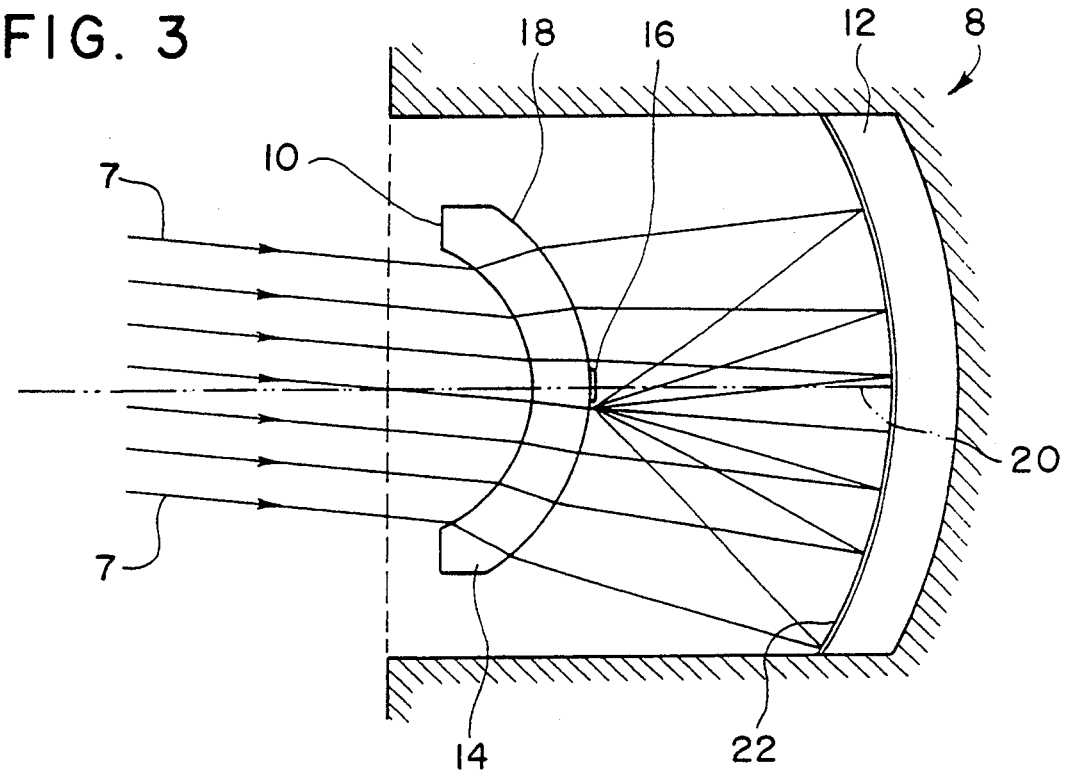
FIG. 3 is an external view of the cat-eye retroreflector of FIG. 2 wherein the laser beam is not reflected because it is not in the field of view.

In FIG. 3, the cat-eye retroreflector 8 is shown in the case where the laser beam 7 is not orthogonal to the retroreflector 8 and thus does not fall within the field of view of the cat-eye retroreflector 8. Because the laser beam 7 is not orthogonal to the retroreflector 8, the reflective surface 22 of the spherical primary 12 reflects the laser beam 7 at an angle that does not strike the reflective portion 16. Because the laser beam 7 does not strike the aluminized selected portion 16 on the spherical secondary 14, the laser beam 7 is not reflected to the spherical primary 12 and returned from the cat-eye retroreflector 8 in the direction of its source.

By virtue of the limited field of view of the cat-eye retroreflector, the spherical array 2 in FIG. 1 can be constructed using a cat-eye retroreflector 8 for each of the retroreflectors 4, so that only one retroreflector at a time reflects the laser beam 6 from the laser retroreflector array 2. As a result, coherence effects are eliminated; polarization effects are eliminated, and only minuscule wavelength effects are present. Also, only one retroreflector at a time will reflect a laser beam because of their placement on the curved surface of the sphere. Thus, ranging accuracy is not affected by the production of more than one reflected beam.

The cat-eye retroreflector using the concentric objective described above can be utilized, for example, in the LAGEOS2 satellite mentioned above. By implementing the cat-eye retroreflectors of the present invention with the concentric objective, as described, in the LAGEOS2 satellite in place of the conventional cube-corner prism retroreflectors, the resulting array has a virtually similar lidar cross section but provides a precision of better than 0.5 mm rather than the approximately 0.5 cm precision provided by the conventional LAGEOS2 satellite using cube-corner prisms. This improvement in precision eliminates the target as a source of error in the laser arranging system.

While the invention has been illustrated and described in detail in the drawings and foregoing description, it will be recognized that many changes and modifications will occur to those skilled in the art. It is therefore intended, by the appended claims, to cover any such changes and modifications as fall within the true spirit and scope of the invention.

What is claimed is:

1. A retroreflector array capable of reflecting a single laser beam in an opposite direction, said retroreflector array comprising:
   an array of cat-eye retroreflectors arranged in the form of a sphere, each of said cat-eye retroreflectors including
   a corrector plate through which the laser beam passes, and
   a spherical primary mirror, having a common center with said corrector plate, disposed behind said corrector plate so as to reflect the laser beam back towards a rear surface of said corrector plate, and
   wherein a rear surface of said corrector plate includes a partial mirror.

2. A laser retroreflector array according to claim 1, wherein the rear surface of each said corrector plate includes the partial mirror over a portion of said corrector plate.

3. A laser retroreflector array according to claim 2, wherein a size of the portion is selected sufficient to reflect the laser beam when the laser beam falls in a field of view which is substantially orthogonal to each respective retroreflector.

4. A laser retroreflector array according to claim 2, wherein each said spherical primary mirror has a focal plane on the rear surface of said corrector plate.

5. A laser retroreflector array according to claim 2, wherein the rear surface of each said corrector plate is metalized over a portion of the focal plane on the rear surface of said corrector plate.

6. A cat-eye retroreflector for reflecting a laser beam in an opposite direction, comprising:
   a spherical corrector plate having a concave front surface through which the laser beam passes, and
   a spherical primary mirror, having a common center with said spherical corrector plate, disposed behind said spherical corrector plate to reflect the laser beam back towards a rear surface of said corrector plate, and
   wherein a convex rear surface of said spherical corrector plate includes a partial mirror.

7. A cat-eye retroreflector according to claim 6, wherein the rear surface of said spherical corrector plate includes the partial mirror over a portion of said spherical corrector plate.

8. A cat-eye retroreflector according to claim 6, wherein said spherical corrector plate and spherical primary mirror comprise mutually aligned segments of a sphere.

9. A cat-eye retroreflector according to claim 6 wherein said partial mirror is also located at said common center on the rear surface of said spherical corrector plate.

10. A cat-eye retroreflector for reflecting a laser beam in an opposite direction, comprising:
    a spherical primary mirror having a concave reflecting surface which reflects the laser beam; and
    a spherical corrector having a common center with said primary mirror and a concave front surface which directs the laser beam onto said spherical primary mirror and includes a reflective rear surface portion on a convex rear surface facing said spherical primary mirror to receive the laser beam reflected by said spherical primary mirror and to reflect the laser beam back at said spherical primary mirror, the reflective rear surface portion being located at a focal plane of said spherical primary mirror so as to return the laser beam in the direction of its source.

11. A cat-eye retroreflector according to claim 10, wherein the reflective rear surface portion is located at said common center of a back side of said spherical corrector at the focal plane.

* * * * *